United States Patent
Murakami

(10) Patent No.: US 12,462,294 B2
(45) Date of Patent: Nov. 4, 2025

(54) SYSTEM, INFORMATION PROCESSING APPARATUS, AND INFORMATION PROCESSING METHOD

(71) Applicant: TOYOTA JIDOSHA KABUSHIKI KAISHA, Toyota (JP)

(72) Inventor: Takeshi Murakami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/931,670

(22) Filed: Oct. 30, 2024

(65) Prior Publication Data

US 2025/0191037 A1   Jun. 12, 2025

(30) Foreign Application Priority Data

Dec. 7, 2023  (JP) .................................. 2023-206896

(51) Int. Cl.
G06Q 30/0645 (2023.01)
G06Q 10/30 (2023.01)

(52) U.S. Cl.
CPC ......... *G06Q 30/0645* (2013.01); *G06Q 10/30* (2013.01)

(58) Field of Classification Search
CPC . G06Q 30/0284; G06Q 10/30; G06Q 30/0645

(Continued)

(56) References Cited

U.S. PATENT DOCUMENTS 10,504,159 B2    12/2019   Laughlin et al.
2016/0167607 A1*  6/2016   Rai ..................... B60R 16/037
                                                      705/307

(Continued)

FOREIGN PATENT DOCUMENTS

JP   2022-067192 A    5/2022
WO   WO-2013076565 A1 *  5/2013  ........... G01R 31/389

OTHER PUBLICATIONS

Y. Ogushi and M. Kandlikar, "The Impact of End-of-Life Vehicle Recycling Law on Automobile Recovery in Japan," 2005 4th International Symposium on Environmentally Conscious Design and Inverse Manufacturing, Tokyo, Japan, 2005, pp. 626-633. (Year: 2005).*

(Continued)

*Primary Examiner* — Jeff Zimmerman
*Assistant Examiner* — Hunter Molnar
(74) *Attorney, Agent, or Firm* — Oliff PLC

(57) ABSTRACT

A controller is provided which is configured to: acquire information on a price of a first portion that is a portion to be reused when a second vehicle is rebuilt from a first vehicle; acquire information on deterioration of the first portion from the first vehicle; acquire information on a cost incurred for reusing the first portion in accordance with the information on the deterioration of the first portion; acquire information on a second portion that is a portion other than the first portion and is equipped on the second vehicle when the second vehicle is rebuilt from the first vehicle; acquire information on a price of the second portion; and output information on a price of the second vehicle in accordance with the information on the price of the first portion, the cost incurred for reusing the first portion, and the price of the second portion.

19 Claims, 9 Drawing Sheets

(58) Field of Classification Search
USPC .......................................................... 705/418
See application file for complete search history.

(56) References Cited

U.S. PATENT DOCUMENTS

| | | | |
|---|---|---|---|
| 2018/0251172 A1* | 9/2018 | Hall | .................... G06Q 10/20 |
| 2022/0122153 A1* | 4/2022 | Onishi | ............... G06Q 30/0206 |
| 2024/0037611 A1 | 2/2024 | Mezaael et al. | |
| 2024/0078521 A1* | 3/2024 | Tanihata | ................ G06Q 50/04 |

OTHER PUBLICATIONS

F. Afrinaldi, M. Z. Mat Saman and A. Mohamad Shaharoun, "A decision making software for end-of-life vehicle disassemblability and recyclability analysis," 2009 IEEE International Conference on Industrial Engineering and Engineering Management, Hong Kong, China, 2009, pp. 2261-2265. (Year: 2009).*

* cited by examiner

STORAGE UNIT 32

VEHICLE INFORMATION DB 321

| VEHICLE ID | VEHICLE TYPE | EQUIPMENT | YEAR | VEHICLE INFORMATION | CONTRACT EXPIRATION DATE |
|---|---|---|---|---|---|
| V001 | xxx | xxx | xxx | xxx | xxx |
| ... | ... | ... | ... | ... | ... |

EQUIPMENT INFORMATION DB 322

| VEHICLE TYPE | EQUIPMENT | PRICE |
|---|---|---|
| xxx | xxx | xxx |
| ... | ... | ... |

REBUILDING COST INFORMATION DB 323

| VEHICLE INFORMATION | REBUILDING COST |
|---|---|
| xxx | xxx |
| ... | ... |

RESIDUAL VALUE INFORMATION DB 324

| VEHICLE TYPE | RESIDUAL VALUE TABLE |
|---|---|
| xxx | xxx |
| ... | ... |

FIG. 5

SYSTEM, INFORMATION PROCESSING APPARATUS, AND INFORMATION PROCESSING METHOD

CROSS REFERENCE TO THE RELATED APPLICATION

This application claims the benefit of Japanese Patent Application No. 2023-206896, filed on Dec. 7, 2023, which is hereby incorporated by reference herein in its entirety.

BACKGROUND

Technical Field

The present disclosure relates to a system, an information processing apparatus, and an information processing method.

Description of the Related Art

There is known a technique that calculates a lease fee per unit period (e.g., per month) based on a total lease amount and a planned lease period (for example, Patent Literature 1).

CITATION LIST

Patent Literature

Patent Literature 1: JP 2022-067192 A

SUMMARY

An object of the present disclosure is to allow a user to select his or her desired equipment of a vehicle while reducing an amount of payment made by the user using the vehicle.

Solution to Problem

One aspect of the present disclosure is directed to an information processing apparatus including a controller configured to:
  acquire information on a price of a first portion, which is a portion to be reused when a second vehicle is rebuilt from a first vehicle;
  acquire information on deterioration of the first portion from the first vehicle;
  acquire information on a cost incurred for reusing the first portion in accordance with the information on the deterioration of the first portion;
  acquire information on a second portion that is a portion other than the first portion and is equipped on the second vehicle when the second vehicle is rebuilt from the first vehicle;
  acquire information on a price of the second portion; and
  output information on a price of the second vehicle in accordance with the information on the price of the first portion, the information on the cost incurred for reusing the first portion, and the information on the price of the second portion.

Another aspect of the present disclosure is directed to an information processing method for causing a computer to perform:
  acquire information on a price of a first portion, which is a portion to be reused when a second vehicle is rebuilt from a first vehicle;
  acquire information on deterioration of the first portion from the first vehicle;
  acquire information on a cost incurred for reusing the first portion in accordance with the information on the deterioration of the first portion;
  acquire information on a second portion that is a portion other than the first portion and is equipped on the second vehicle when the second vehicle is rebuilt from the first vehicle;
  acquire information on a price of the second portion; and
  output information on a price of the second vehicle in accordance with the information on the price of the first portion, the information on the cost incurred for reusing the first portion, and the information on the price of the second portion.

A further aspect of the present disclosure is directed to a non-transitory storage medium storing a program for causing a computer to: acquire information on a price of a first portion, which is a portion to be reused when a second vehicle is rebuilt from a first vehicle;
  acquire information on deterioration of the first portion from the first vehicle;
  acquire information on a cost incurred for reusing the first portion in accordance with the information on the deterioration of the first portion;
  acquire information on a second portion that is a portion other than the first portion and is equipped on the second vehicle when the second vehicle is rebuilt from the first vehicle;
  acquire information on a price of the second portion; and
  output information on a price of the second vehicle in accordance with the information on the price of the first portion, the information on the cost incurred for reusing the first portion, and the information on the price of the second portion.

A still further aspect of the present disclosure is directed to the program described above.

Advantageous Effects of Invention

According to the present disclosure, it is possible to allow a user to select his or her desired equipment of a vehicle while suppressing an amount of payment made by the user using the vehicle.

BRIEF DESCRIPTION OF THE DRAWINGS

FIG. 5 is a diagram illustrating table configurations of a vehicle information DB, an equipment information DB, a rebuilding cost information DB, and a residual value information DB;

DESCRIPTION OF THE EMBODIMENTS

Figure 1:
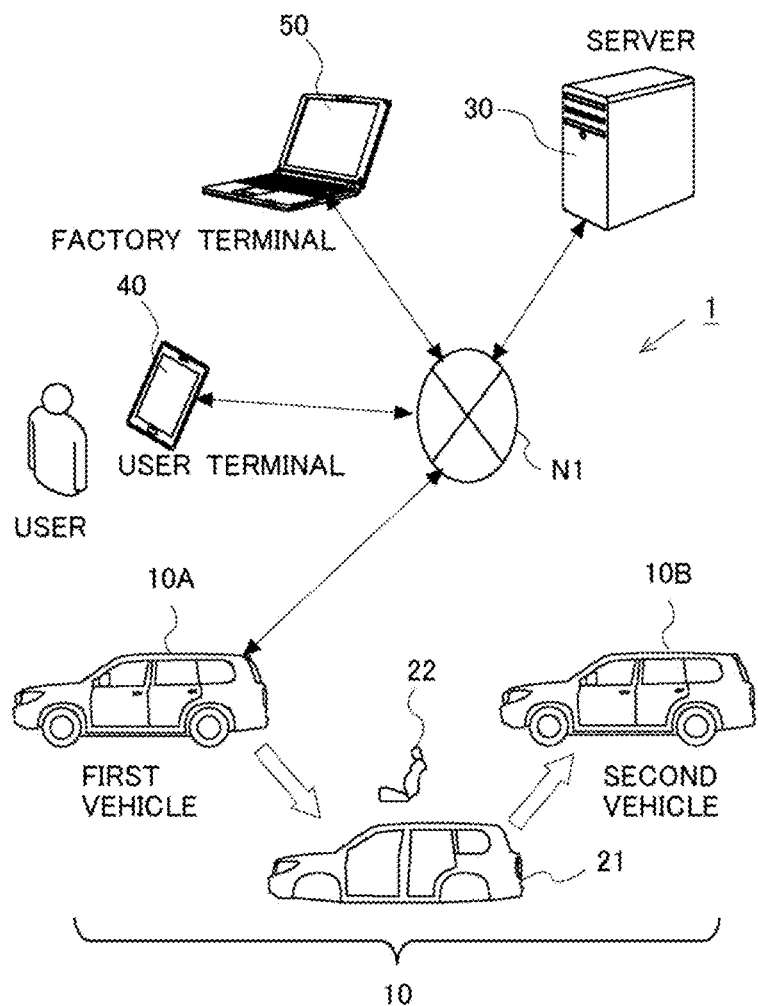
FIG. 1 is a view illustrating a schematic configuration of a system according to an embodiment.

If a user selects optional parts or selects a high-grade vehicle when making a lease contract, equipment may be installed that the user does not need. Therefore, a lease fee may be expensive. The same is true when purchasing a vehicle. In addition, in the case of leasing a used vehicle, even if a user desires a particular piece of equipment, it may be difficult to install it on the vehicle. For example, when purchasing a used vehicle, it is difficult to change seats or interior, or add a driving support system.

Therefore, an information processing apparatus according to one aspect of the present disclosure includes a controller configured to: acquire information on a price of a first portion that is a portion to be reused when a second vehicle is rebuilt from a first vehicle; acquire information on deterioration of the first portion from the first vehicle; acquire information on a cost incurred for reusing the first portion in accordance with the information on the deterioration of the first portion; acquire information on a second portion that is a portion other than the first portion and is equipped on the second vehicle when the second vehicle is rebuilt from the first vehicle; acquire information on a price of the second portion; and output information on a price of the second vehicle in accordance with the information on the price of the first portion, the information on the cost incurred for reusing the first portion, and the information on the price of the second portion.

The first vehicle is, for example, a vehicle that is made available to the user for a certain period of time by making a contract, such as a lease, a subscription, a rental or the like. The second vehicle is a vehicle that is refurbished or rebuilt from the first vehicle. The second vehicle may also be, for example, a vehicle that is made available to the user for a certain period of time by making a contract such as a lease, a subscription, a rental or the like, or it may be a vehicle that is sold. The first vehicle is, for example, a connected vehicle that is capable of communicating with the information processing apparatus. The first vehicle is configured to include the first portion. The first portion is a portion that is reused when the first vehicle is rebuilt into the second vehicle.

An amount of money paid by a user of the second vehicle when using the second vehicle depends on the price of the first portion, the cost incurred for reusing the first portion, and the price of the second portion. The first portion may deteriorate during the use of the first vehicle. This deterioration may necessitate repairs or the like when the first portion is reused. The cost incurred in performing the repairs or the like is borne by the user of the second vehicle. Therefore, the controller acquires information on the deterioration of the first portion from the first vehicle. Then, information on the cost incurred for reusing the first portion is acquired in accordance with the information on the deterioration of the first portion. The cost incurred in reusing the first portion include, for example, the cost incurred when repairing, adjusting, and/or replacing parts of the first portion in order to restore the functionality of the first portion.

In addition, the controller acquires information on the second portion from, for example, a terminal of the user. The second portion is, for example, a piece of equipment selected by the user. The combination of the first portion and the second portion constitutes the second vehicle. Note that the second portion may include a new piece of equipment and a re-used piece of equipment that is installed on the first vehicle and is to be reused. The second portion may include a plurality of pieces of equipment. The second portion has a price set, and the controller acquires information on that price. The information on the price may be stored in the information processing apparatus.

The price corresponding to the first portion to be reused is also borne by the user of the second vehicle. However, the price of the first portion in the second vehicle is set to be lower than the price of the first portion when new. Here, the fee for the first portion was also paid by the user of the first vehicle when the first vehicle was used. Therefore, the user of the second vehicle should be charged the price obtained by subtracting the amount already paid for the first portion from the price of the first portion when it was new. In this case, the longer the period of use of the first portion is, the lower the price of the first portion may be set.

Then, the controller outputs information on the price of the second vehicle. The information on the price of the second vehicle may be output to, for example, a terminal of a user who requests the use of the second vehicle. At this time, the controller may generate a command to display the price of the second vehicle on the terminal of the user, and transmit the command to the terminal of the user. The price of the second vehicle may include, for example, a lease fee in the case of leasing the second vehicle or a sales price in the case of selling the second vehicle. The price of the second vehicle includes the price of the first portion, the cost incurred for reusing the first portion, and the price of the second portion. The price of the first portion, for example, will become lower depending on the period of use of the first portion, so the user of the second vehicle will pay a lower price for the first portion than when it was new. Also, only the second portion selected by the user can be installed. Therefore, it is possible to suppress the installation of unnecessary equipment, thus preventing the price for the second portion from becoming too high. For example, if the sum of the price of the first portion and the cost incurred for reusing the first portion is set to be lower than the price of the first portion when new, the user can use the second vehicle at a lower cost than leasing or purchasing a new vehicle. For example, if the degree of deterioration of the first portion is equal to or greater than a threshold value or if the first portion has a predetermined accident history, the cost incurred for reusing the first portion may be too high, and such a first portion need not be reused.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to an embodiment. In the example of FIG. 1, the system 1 includes a server 30, a user terminal 40, and a factory terminal 50. The vehicle 10 includes a first vehicle 10A before being rebuilt and a second vehicle 10B after being rebuilt. The second vehicle 10B is a vehicle that has been rebuilt or recycled from the first vehicle 10A. The first vehicle 10A is a vehicle that has been used as a lease vehicle. The second vehicle 10B is, for example, a vehicle to be leased again. The first vehicle 10A and the second vehicle 10B are vehicles having equipment 22 selected by respective users via their user terminals 40. The vehicle 10 includes a base unit 21 that is reused when the vehicle 10 is rebuilt, and the equipment 22 that is not reused and is newly selected by the user of the second vehicle.

The base unit 21 is what is reused when the first vehicle 10A is rebuilt into the second vehicle 10B, and includes, for example, an electronic platform, a monocoque body, an engine, an electric motor, auxiliaries, etc. The base unit 21 is reused until the end of a rebuilding (recycling) service period if the period of use is, for example, eight years or less and there is no particular problem. In this case, the second vehicle 10B may be recycled or rebuilt. The case where there is no particular problem here is, for example, a case where the degree of deterioration of the base unit 21 is less than a threshold value or a case where there is no history of repair due to an accident. The base unit 21 is an example of the first portion.

The equipment 22 selected by the user (hereinafter, also referred to as the selection equipment 22) includes, for example, a safety driving support system, an engine hood, front and rear fenders, doors, a back door, rocker moldings, emblems, lamps, exterior, an instrument panel, interior, seats, seatbelts, tires, wheels, audio devices, a navigation device, etc. The selection equipment 22 is an example of the second portion.

The server 30 is a computer that provides an online leasing service for the vehicle 10. The server 30 is managed by, for example, a leasing company. A user who uses the online leasing service accesses a lease site (a website leasing the vehicle 10) through a web browser on the user terminal 40 and applies for the leasing of the vehicle 10. At this time, the equipment 22 can be selected as an option. The server 30 determines a lease fee for the second vehicle 10B, including a price corresponding to the base unit 21, a cost incurred for reusing the base unit 21 of the first vehicle 10A, and a price corresponding to the equipment 22 selected by the user.

Here, note that the factory terminal 50 in FIG. 1 is a terminal used in a place where information on the vehicle 10 can be acquired, such as a factory, an automobile dealer or the like that performs inspection or maintenance of the vehicle 10. In the factory, the vehicle 10 is serviced or maintained, and information on the maintenance of the vehicle 10, information on the condition of the vehicle 10, and information on the accident history of the vehicle 10 are transmitted to the server 30. It should be noted that the factory terminal 50 according to the present embodiment is not necessarily required.

The server 30 presents the lease fee to the user terminal 40 via, for example, a website of the Internet, and makes a lease contract based on information input by the user to the user terminal 40. In the present embodiment, the server 30 is configured to be able to run a web server for interacting with the user terminal 40. When the user accesses a web server through a browser of the user terminal 40, the server 30 displays a web page for presenting a lease fee on the browser of the user terminal 40. Then, when the server 30 receives a request for a lease contract from the user terminal 40, it performs processing for making the lease contract.

The user terminal 40 is a computer used by the user who uses the lease site. The user terminal 40 has, for example, a web browser installed. Using this web browser, the user concludes a lease contract for the vehicle 10. Note that the lease contract may be concluded not only through a web browser but also through other application software. When the lease contract is concluded, information on the lease fee is transmitted from the server 30 to the user terminal 40.

The vehicle 10, the server 30, the user terminal 40, and the factory terminal 50 are connected to one another via a network N1. Here, note that the network N1 is, for example, a global public communication network such as the Internet or the like, but a WAN (Wide Area Network) or other communication networks may be employed. Also, the network N1 may include a telephone communication network such as a mobile phone network or the like, and/or a wireless communication network such as Wi-Fi (registered trademark) or the like.

Figure 2:
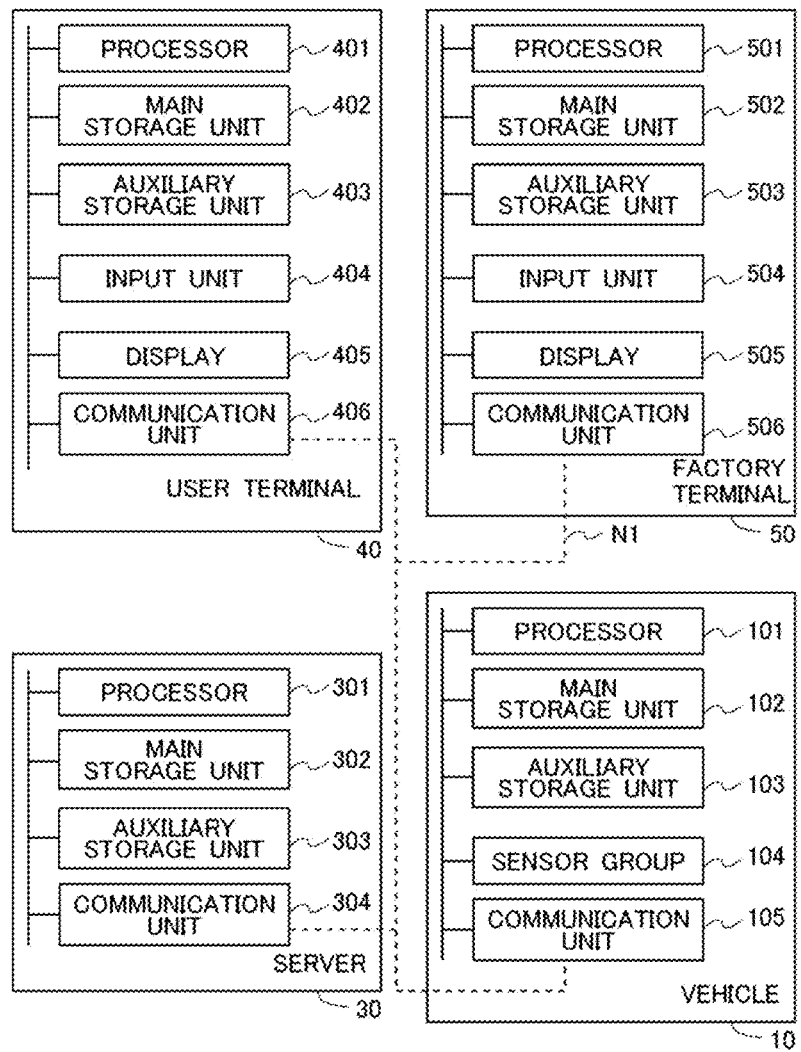
FIG. 2 is a block diagram schematically illustrating an example of a configuration of each of a vehicle, a server, a user terminal, and a factory terminal, which together constitute the system according to the embodiment.

Next, the hardware configurations of the vehicle 10, the server 30, the user terminal 40, and the factory terminal 50 will be described based on FIG. 2. FIG. 2 is a block diagram schematically illustrating an example of a configuration of each of the vehicle 10, the server 30, the user terminal 40, and the factory terminal 50, which together constitute the system 1 according to the embodiment.

The server 30 has a configuration of a computer. The server 30 provides a leasing service to the user. The server 30 includes a processor 301, a main storage unit 302, an auxiliary storage unit 303, and a communication unit 304. These components are mutually connected to one another by means of a bus. Note that the server 30 is an example of an information processing apparatus. Also, the processor 301 is an example of a controller.

The processor 301 is a CPU (Central Processing Unit), a DSP (Digital Signal Processor), or the like. The processor 301 controls the server 30 thereby to perform various information processing operations. The main storage unit 302 is a RAM (Random Access Memory), a ROM (Read Only Memory), or the like. The auxiliary storage unit 303 is an EPROM (Erasable Programmable ROM), a hard disk drive (HDD), a removable medium, or the like. The auxiliary storage unit 303 also stores an operating system (OS), various kinds of programs, various kinds of tables, and the like. The processor 301 loads the programs stored in the auxiliary storage unit 303 into a work area of the main storage unit 302 and executes the programs, so that each of the component units and the like is controlled through the execution of the programs. As a result, the server 30 realizes functions that match predetermined purposes. The main storage unit 302 and the auxiliary storage unit 303 are computer-readable recording media. Here, note that the server 30 may be a single computer or a plurality of computers that cooperate with one another. In addition, the information stored in the auxiliary storage unit 303 may be stored in the main storage unit 302. Also, the information stored in the main storage unit 302 may be stored in the auxiliary storage unit 303.

The communication unit 304 is a means that communicates with the vehicle 10, the user terminal 40, and the factory terminal 50 via the network N1. The communication unit 304 is, for example, a LAN (Local Area Network) interface board, a wireless communication circuit for wireless communication, or the like. The LAN interface board or the wireless communication circuit is connected to the network N1.

The user terminal 40 is, for example, a smart phone, a mobile phone, a tablet terminal, a personal information terminal, a wearable computer (such as a smart watch or the like), or a small computer such as a personal computer (PC).

The user terminal 40 includes a processor 401, a main storage unit 402, an auxiliary storage unit 403, an input unit 404, a display 405, and a communication unit 406. These components are mutually connected to one another by means of a bus. The processor 401, the main storage unit 402 and the auxiliary storage unit 403 of the user terminal 40 are the same as the processor 301, the main storage unit 302 and the auxiliary storage unit 303 of the server 30, respectively, and hence, the description thereof will be omitted.

The input unit 404 is a means that receives an input operation performed by the user, and is, for example, a touch panel, a mouse, a keyboard, a microphone, or the like. The display 405 is a means that presents information to the user, and is, for example, an LCD (Liquid Crystal Display), an EL (Electroluminescence) panel, or the like. Note that the input unit 404 and the display 405 may be configured as a single touch panel display.

The communication unit 406 is a communication means that connects the user terminal 40 to the network N1. The communication unit 406 is, for example, a circuit that communicates with other devices (e.g., the server 30 and the like) via the network N1 by making use of a mobile communication service (e.g., a telephone communication network such as 6G (6th Generation), 5G (5th Generation), 4G (4th Generation), 3G (3rd Generation), or LTE (Long Term Evolution)) or a wireless communication network such as Wi-Fi (registered trademark) or the like.

The vehicle 10 includes a processor 101, a main storage unit 102, an auxiliary storage unit 103, a sensor group 104, and a communication unit 105. These components are mutually connected to one another by means of a bus. Each of these components may not necessarily be a single module, but may be realized by a combination of in-vehicle devices such as a DCM (Data Communication Module), a head unit, a car navigation system, etc. The processor 101, the main storage unit 102, the auxiliary storage unit 103, and the communication unit 105 of the vehicle 10 are the same as the processor 401, the main storage unit 402, the auxiliary storage unit 403, and the communication unit 406 of the user terminal 40, and thus the description thereof will be omitted.

The sensor group 104 is a plurality of sensors including, for example, a sensor for detecting the condition of the vehicle 10, a sensor for detecting the action of the driver, and the like. The sensor group 104 includes, for example, a speed sensor, an acceleration sensor, an accelerator opening sensor, a steering angle sensor, a yaw rate sensor, a shift position sensor, a position information sensor (GPS sensor), a brake switch, an engine speed sensor, a travel distance sensor, and a battery temperature sensor. Also, the sensor group 104 may include a sensor for detecting the lighting states of various warning lamps.

The factory terminal 50 is a computer such as a smart phone, a mobile phone, a tablet terminal, a personal information terminal, a wearable computer (such as a smart watch), a personal computer (PC), or the like.

The factory terminal 50 includes a processor 501, a main storage unit 502, an auxiliary storage unit 503, an input unit 504, a display 505, and a communication unit 506. These components are mutually connected to one another by means of a bus. The processor 501, the main storage unit 502, the auxiliary storage unit 503, the input unit 504, the display 505, and the communication unit 506 of the factory terminal 50 are the same as the processor 401, the main storage unit 402, the auxiliary storage unit 403, the input unit 404, the display 405, and the communication unit 406 of the user terminal 40, respectively, and hence, the description thereof will be omitted.

Figure 3:
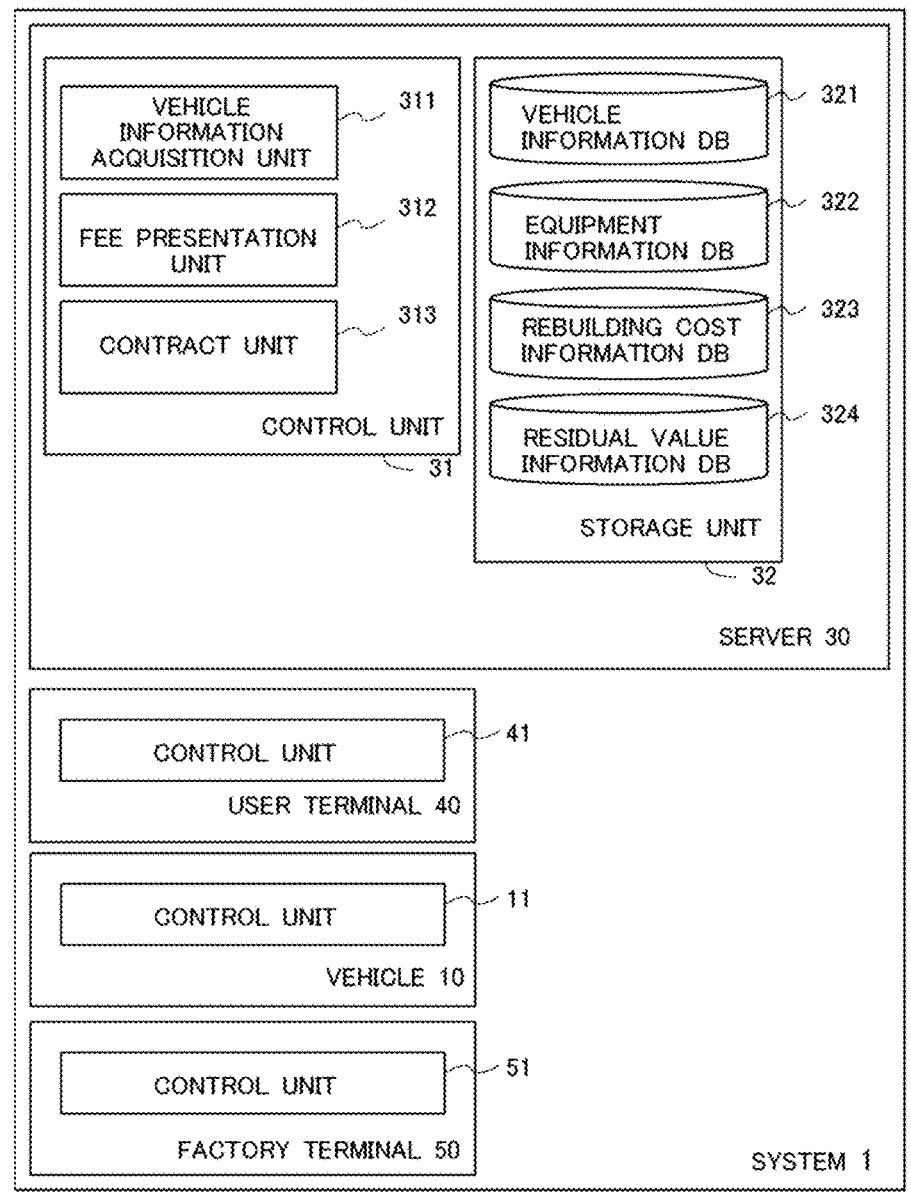
FIG. 3 is a diagram illustrating a functional configuration of each of the vehicle, the server, the user terminal, and the factory terminal, which together constitute the system according to the embodiment.

Next, functions of the vehicle 10, the server 30, the user terminal 40, and the factory terminal 50 will be described. FIG. 3 is a diagram illustrating functional configurations of the vehicle 10, the server 30, the user terminal 40, and the factory terminal 50, which together constitute the system 1 according to the embodiment. The server 30 includes a control unit 31 and a storage unit 32 as its functional components. The processor 301 of the server 30 executes the processing of the control unit 31 by means of a computer program on the main storage unit 302. Note that a part of the processing of the control unit 31 may be executed by another computer connected to the network N1. The control unit 31 includes, as its functional modules, a vehicle information acquisition unit 311, a fee presentation unit 312, and a contract unit 313.

The storage unit 32 is configured to include a main storage unit 302 and an auxiliary storage unit 303. The storage unit 32 stores a vehicle information DB 321, an equipment information DB 322, a rebuilding cost information DB 323, and a residual value information DB 324. The vehicle information DB 321, the equipment information DB 322, the rebuilding cost information DB 323, and the residual value information DB 324 are, for example, relational databases constructed by a program of a database management system (DBMS) that is executed by the processor 301 managing the data stored in the auxiliary storage unit 303.

The vehicle information acquisition unit 311 acquires information on the vehicle (hereinafter referred to as vehicle information) from the vehicle 10 and the factory terminal 50, and stores the vehicle information in the vehicle information DB 321. The vehicle information includes information obtained by a self-diagnosis function (on-board diagnosis) of the vehicle 10, output data from the sensor group 104, information on the maintenance of the vehicle 10, and the like. The vehicle information includes information corresponding to the deterioration of the base unit 21. The information obtained by the self-diagnosis function of the vehicle 10 and the output data from the sensor group 104 are transmitted from the vehicle 10 to the server 30 at predetermined time intervals. In addition, when maintenance of the vehicle 10 is performed in the factory, vehicle information is transmitted from the factory terminal 50 to the server 30. The vehicle information to be transmitted from the factory terminal 50 to the server 30 may include information on the maintenance of the vehicle 10, information on the condition of the vehicle 10, and information on the accident history of the vehicle 10. The information on the maintenance of the vehicle 10 may include, for example, information on the content of the maintenance. The information on the condition of the vehicle 10 may include, for example, information on the state of deterioration of the interior of the vehicle 10. The vehicle information to be transmitted from the factory terminal 50 to the server 30 may be transmitted from the factory terminal 50 to the server 30 via the vehicle 10. The vehicle information is an example of the information on the deterioration of the first portion.

When the user terminal 40 accesses the lease site, the fee presentation unit 312 calculates a lease fee for leasing the second vehicle 10B, and transmits the lease fee thus calculated to the user terminal 40. Accordingly, the fee presentation unit 312 presents the lease fee to the user. The lease fee is a fee that is paid per month when the user leases the vehicle 10. The lease fee is a fixed monthly amount over the period of the lease contract. The lease fee is set so that profits can be secured in six years from when the base unit 21 is brand new. The lease fee may be set so that the gross profit margin is equal to or greater than a predetermined value.

Since the first vehicle 10A is a lease vehicle, a lease period thereof is determined in advance. Then, the first vehicle 10A is returned to the leasing company by the date on which the lease contract expires. After the first vehicle 10A is returned to the leasing company, the leasing company recycles or rebuilds the second vehicle 10B from the first vehicle 10A. Here, it is assumed that a predetermined period of time before the date on which the lease contract for the first vehicle 10A expires is a period of time during which the first vehicle 10A can be returned to the leasing company. Then, the fee presentation unit 312 extracts, as candidates to be rebuilt into the second vehicle 10B, a first vehicle 10A during this predetermined period of time and a first vehicle 10A after this predetermined period of time has passed. Then, the fee presentation unit 312 can extract a first vehicle 10A even before the lease contract for the first vehicle 10A expires. Therefore, a rebuilding plan for the first vehicle 10A can be made before the lease contract for the first vehicle 10A expires. In addition, the fee presentation unit 312 calculates the lease fee based on the vehicle information of the first vehicle 10A thus extracted, as will be described below, so that it can calculate a lease fee for the second vehicle 10B even before the lease contract for the first vehicle 10A expires.

Figure 4:
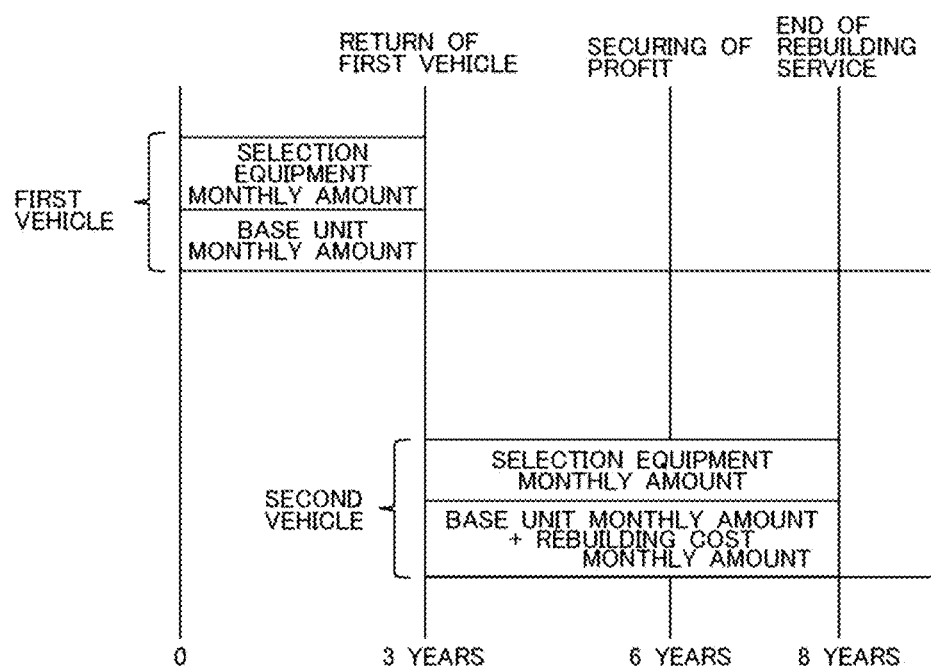
FIG. 4 is a diagram schematically illustrating a breakdown of monthly lease fees for a first vehicle and a second vehicle.

The fee presentation unit 312 calculates the lease fee according to the price of the base unit 21, the cost incurred for reusing the base unit 21, and the price of the selection equipment 22. Here, FIG. 4 is a diagram schematically illustrating a breakdown of monthly lease fees for the first vehicle 10A and the second vehicle 10B. FIG. 4 illustrates a case in which the first vehicle 10A is leased for three years, and thereafter is recycled or rebuilt as the second vehicle 10B, which is then leased for five years. The lease fee for the first vehicle 10A includes a monthly amount for the base unit (hereinafter, also referred to as a base unit monthly amount) and a monthly amount for the selection equipment (hereinafter, also referred to as a selection equipment monthly amount). Note that the lease fee for the first vehicle 10A may further include taxes, insurance premiums, maintenance fees, etc., to be paid during the contract period. In addition, the lease fee for the second vehicle 10B includes a base unit monthly amount, a monthly amount for the rebuilding cost (hereinafter, also referred to as a rebuilding cost monthly amount), and a selection equipment monthly amount. Note also that the lease fee for the second vehicle 10B may further include taxes, insurance premiums, maintenance fees, etc., to be paid during the contract period. The service for rebuilding the vehicle 10 has an expiration date, and the vehicle 10 can be rebuilt until the expiration date passes.

The base unit monthly amount is the price of the base unit 21 prorated on a monthly basis. The base unit monthly amount is calculated based on the residual value of the base unit 21 at the time of the lease contract and the residual value of the base unit 21 at the end of the lease contract. The residual value of the base unit 21 is an evaluation value of the base unit 21 after a predetermined period of time has passed. The residual value information DB 324 stores a residual value table of the base unit 21 for each vehicle type. The residual value table is a table in which predicted residual values of the base unit 21 corresponding to the number of months that have passed from the new vehicle registration are stored. The residual value table is generated such that the residual value decreases as the period of use of the base unit 21 increases. The method of calculating the residual value of the base unit 21 corresponding to the number of months passed from the time of sale of the new vehicle is not limited. A known technique can be used for the calculation of the residual value. For example, the residual value may be calculated on the assumption that the price of the base unit 21 when new changes linearly so as to become zero after a predetermined number of years. In addition, for example, the residual value of the base unit 21 is calculated based on the price of the base unit 21 when new so as to ensure a profit for the leasing company in six years. Note that a calculation formula for calculating the residual value of the base unit 21 may be stored in the storage unit 32.

The price of the base unit 21 may vary depending on the vehicle model or type. Therefore, in order to allow the user to select a vehicle type, the fee presentation unit 312 may generate a command to display a screen for selecting a vehicle type on the display 405 of the user terminal 40, and transmit the command to the user terminal 40. Upon acquiring the information on the vehicle type from the user terminal 40, the fee presentation unit 312 may extract the first vehicle 10A corresponding to the vehicle type.

The base unit monthly amount may vary depending on the number of months of the contract. Therefore, when calculating the base unit monthly amount, the fee presentation unit 312 acquires information on the number of months of the contract desired by the user from the user terminal 40. Note that it is not essential to acquire information on the number of months of the contract from the user terminal 40, but the number of months of the contract may be a predetermined fixed value, for example.

In the case of the first vehicle 10A, the fee presentation unit 312 calculates the base unit monthly amount by subtracting the residual value after three years from the price of the base unit 21 when new, and dividing the result by 36, which is the number of months of the contract. Also, in the case of the second vehicle 10B, the fee presentation unit 312 calculates the base unit monthly amount by subtracting the residual value at the end of the contract from the residual value of the base unit 21 after three years have passed, and dividing the result by the number of months of the contract.

The selection equipment monthly amount shown in FIG. 4 is the price of the equipment 22 selected by the user (i.e., the selection equipment 22) prorated on a monthly basis. The fee presentation unit 312 calculates the selection equipment monthly amount by dividing the price corresponding to the selection equipment 22 by the number of months of the contract. In cases where there are a plurality of pieces of selection equipment 22, the monthly amount corresponding to each selection equipment 22 is added. When the second vehicle 10B is rebuilt from the first vehicle 10A, all pieces of the selection equipment 22 installed on the first vehicle 10A are removed. Therefore, the residual value is not set for the selection equipment 22. However, in cases where there are pieces of reusable selection equipment 22, they may be reused in the second vehicle 10B. The reusable selection equipment 22 may be treated as a part of the base unit 21. Note that a relationship between the equipment 22 and the price thereof is stored in the equipment information DB 322.

The selection equipment 22 includes, for example, a piece of equipment 22 which is available as an option when purchasing a new vehicle, but which is generally difficult to install on the vehicle 10 at a later time. For example, in cases where a piece of equipment 22 is to be installed that significantly changes the overall length, width, or mass of the vehicle, it may be difficult to later install the equipment 22 on the vehicle 10 because of potential regulatory issues. On the other hand, the second vehicle 10B according to the present embodiment can solve the regulatory issues by receiving inspection based on the laws and regulations after the equipment 22 is installed at a factory or the like.

The fee presentation unit 312 accesses the equipment information DB 322 to extract those pieces of equipment 22 that correspond to the vehicle type selected by the user. Then, in order to allow the user to select the equipment 22, the fee presentation unit 312 generates a command to display a selection screen for the equipment 22 on the display 405 of the user terminal 40, and transmits the command to the user terminal 40. This selection screen may display a description of the equipment 22 and, for example, radio buttons for selecting the equipment 22. When the user selects a piece of equipment 22 on the user terminal 40, information on the selected piece of equipment 22 is transmitted from the user terminal 40. The fee presentation unit 312 acquires information on the selected equipment 22 from the user terminal 40.

In addition, the rebuilding cost monthly amount is added to the lease fee for the second vehicle 10B. The rebuilding cost monthly amount is the cost incurred for reusing the base unit 21 prorated on a monthly basis. The fee presentation unit 312 calculates the rebuilding cost monthly amount by dividing the cost incurred for reusing the base unit 21 by the number of months of the contract. The cost incurred for reusing the base unit 21 is the cost required for repairing and adjusting the base unit 21 when the vehicle 10 is rebuild.

The fee presentation unit 312 acquires the cost required for repairing and adjusting the base unit 21 based on the vehicle information. The repair and adjustment of the base unit 21 of the vehicle 10 may include actions to restore or maintain the functionality of the base unit 21. For example, this includes replacing deteriorated or damaged parts, repainting, updating software programs, adjusting various devices, etc. Note that in the following description, the term "repair" includes adjustments and other actions for recovering or maintaining the functionality of the base unit 21.

The cost incurred for reusing the base unit 21 for the vehicle information is stored in the rebuilding cost information DB 323. Note that as another example, the fee presentation unit 312 may, for example, determine the details of an engine overhaul based on the travel distance of the vehicle 10 or the history of the engine rotation speed, and calculate the cost of engine repair based on the details of this overhaul. Also, as another example, the fee presentation unit 312 may use a machine learning model that uses vehicle information as input data and the cost incurred for reusing the base unit 21 as output data, for example. Further, as still another example, the fee presentation unit 312 may acquire the cost incurred for reusing the base unit 21 by using a statistical method such as regression analysis.

The fee presentation unit 312 calculates the lease fee for the vehicle 10 by calculating the total of the selection equipment monthly amount, the base unit monthly amount, and the rebuilding cost monthly amount. Note that the fee presentation unit 312 can calculate the lease fee based on the selection equipment monthly amount and the base unit monthly amount, even for a new vehicle as described above. In the case of leasing a new vehicle (i.e., in the case of the first vehicle 10A), the rebuilding of the base unit 21 is not performed, and hence, no rebuilding cost monthly amount is required.

After calculating the lease fee, the fee presentation unit 312 generates a command to the user terminal 40 to display the lease fee on the display 405 of the user terminal 40, and transmits the command to the user terminal 40. At this time, a command may be included to display a button for making a lease contract on the display 405 of the user terminal 40.

Then, upon receiving information from the user terminal 40 that the button for making a lease contract has been pressed, the contract unit 313 executes predetermined processing for the lease contract.

FIG. 5 is a diagram illustrating table configurations of the vehicle information DB 321, the equipment information DB 322, the rebuilding cost information DB 323, and the residual value information DB 324. The vehicle information DB 321 has fields for the vehicle ID, vehicle type (model), equipment, year, vehicle information, and contract expiration date. In the vehicle ID field, information for identifying the vehicle 10 (vehicle ID) is entered. In the vehicle type field, information for identifying the type of the vehicle 10 is entered. In the vehicle type field, for example, information on a vehicle name may be entered. In the equipment field, information on the selection equipment 22 installed on the vehicle 10 is entered. In the year field, information on the year of the base unit 21 of the vehicle 10 is entered. The year of the base unit 21 of the vehicle 10 indicates the year in which the base unit 21 of the vehicle 10 was manufactured. Note that information on the year of the base unit 21 of the first vehicle 10A is entered in the year field corresponding to the second vehicle 10B. In the vehicle information field, vehicle information acquired from the vehicle 10 or the factory terminal 50 is entered. In the contract expiration date field, information on the date on which the lease contract will expire is entered.

The equipment information DB 322 has fields for vehicle type, equipment, and price. In the vehicle type field, information for identifying the type of vehicle 10 is entered. In the vehicle type field, for example, information on a vehicle name may be entered. In the equipment field, information on selectable equipment 22 corresponding to the vehicle type is entered. When there are a plurality of pieces of selectable equipment 22 corresponding to the vehicle type, respective pieces of equipment 22 may be stored in different records. In the price field, information on the price of each piece of the equipment 22 is entered.

The rebuilding cost information DB 323 has fields for vehicle information and rebuilding cost. In the vehicle information field, vehicle information that can be acquired from the vehicle 10 is entered. In the rebuilding cost field, information on the cost required for repairing the base unit 21 and corresponding to the vehicle information is entered.

The residual value information DB 324 has fields for vehicle type and residual value table. In the vehicle type field, information for identifying the type of the vehicle 10 is entered. In the vehicle type field, for example, information on a vehicle name may be entered. In the residual value table field, information on the residual value table of the base unit 21 corresponding to the vehicle type is entered. The residual value table field may store a calculation formula for generating the residual value table, or may store information on the place where the residual value table is stored.

Next, the functions of the user terminal 40 will be described. As illustrated in FIG. 3, the user terminal 40 includes a control unit 41 as a functional component. The processor 401 of the user terminal 40 executes the processing of the control unit 41 by a computer program on the main storage unit 402.

The user terminal 40 can access a website on the Internet via a browser. The control unit 41 accesses a lease site in accordance with an input by the user to the input unit 404. At this time, the control unit 41 may transmit a request for displaying the lease fee to the server 30. The control unit 41 displays a page for selecting a vehicle type in accordance with a command transmitted from the server 30. Then, when the user taps a button for selecting a vehicle type set on this page, the control unit 41 transmits information corresponding to the selection of the user to the server 30.

In addition, the control unit 41 displays a page for selecting the equipment 22 in accordance with the command transmitted from the server 30. When the user taps a button for selecting the equipment 22 set on this page, the control unit 41 transmits information corresponding to the selection of the user to the server 30.

Also, the control unit 41 displays a page for inputting the number of months of the contract in accordance with the command transmitted from the server 30. When the user taps a button for selecting the number of months of the contract set on this page, the control unit 41 transmits information corresponding to the selection by the user to the server 30. Note that in the case where the number of months of the contract is a fixed value, the page for inputting the number of months of the contract is not displayed.

Further, the control unit 41 displays the lease fee in accordance with the command transmitted from the server 30. Also, the control unit 41 transmits information for concluding a lease contract to the server 30 in accordance with an input by the user. At this time, for example, information on the name, address, telephone number, e-mail address, credit card number, etc., of the user is transmitted to the server 30.

Now, the functions of the vehicle 10 will be described. As illustrated in FIG. 3, the vehicle 10 includes the control unit 11 as a functional component. The processor 101 of the vehicle 10 executes the processing of the control unit 11 by means of a computer program on the main storage unit 102.

The control unit 11 performs a self-diagnosis of the vehicle 10 at predetermined time intervals. The self-diagnosis can be performed by using a known technique. Also, the control unit 11 collects output data from the sensor group 104 at predetermined time intervals. Then, the control unit 11 transmits information obtained by the self-diagnosis and the output data from the sensor group 104 to the server 30 at predetermined time intervals. These pieces of information are used to calculate the cost required for repairing the base unit 21 when the vehicle 10 is rebuilt.

Next, the functions of the factory terminal 50 will be described. As illustrated in FIG. 3, the factory terminal 50 includes a control unit 51 as a functional component. The processor 501 of the factory terminal 50 executes the processing of the control unit 51 by means of a computer program on the main storage unit 502.

The control unit 51 transmits the maintenance information of the vehicle 10 to the server 30. The maintenance information of the vehicle 10 is information input by a worker to the factory terminal 50, and includes information on the content of the maintenance performed on the vehicle 10, information on the condition of the vehicle 10, and information on the accident history of the vehicle 10. These pieces of information are used to calculate the cost required for repairing the base unit 21 when the vehicle 10 is rebuilt. The maintenance information of the vehicle 10 transmitted to the server 30 is stored in the vehicle information DB 321 of the server 30 as a part of the vehicle information.

Figure 6:
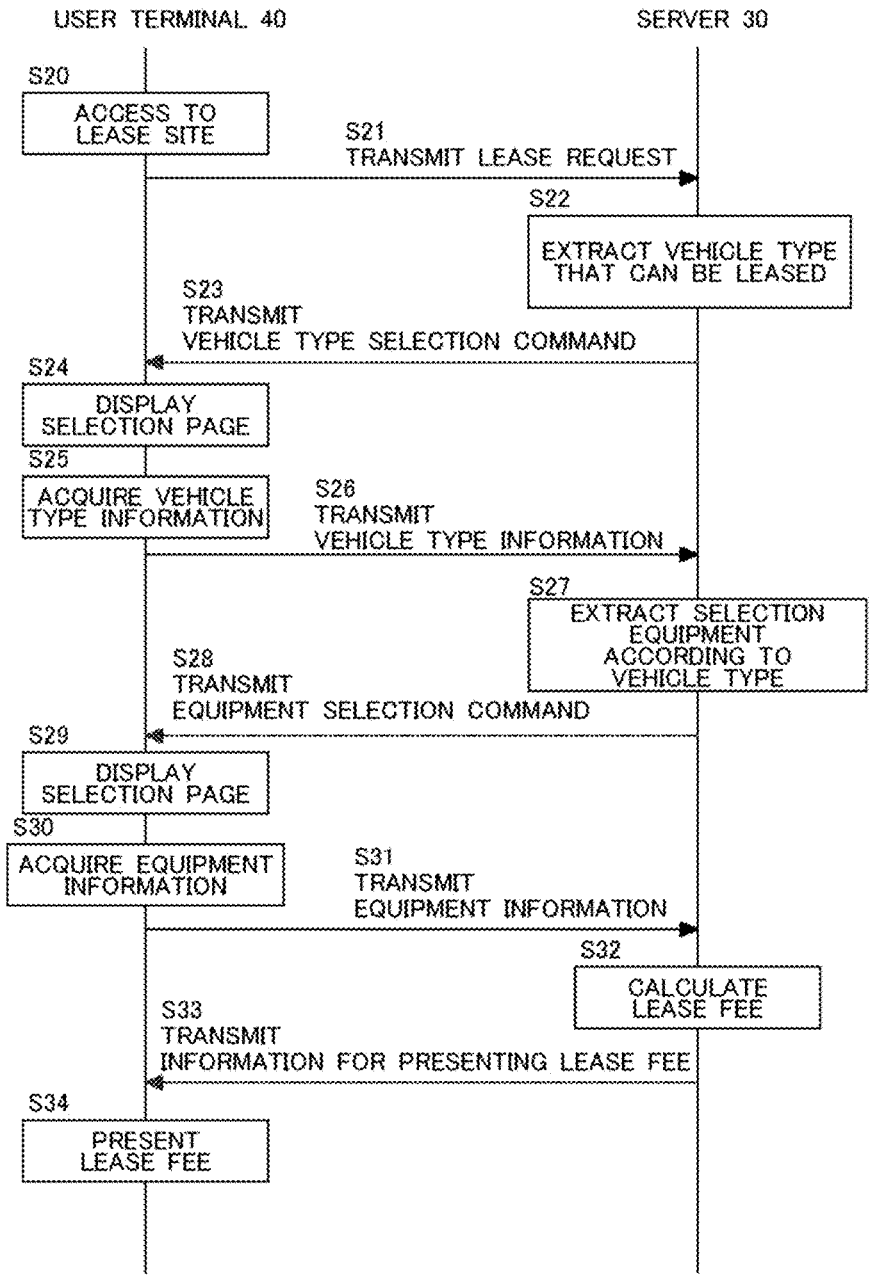
FIG. 6 is a sequence diagram illustrating processing in the user terminal and the server when the user accesses a lease site via the user terminal.

Next, the processing in the user terminal 40 and the server 30 will be described. FIG. 6 is a sequence diagram illustrating the processing in the user terminal 40 and the server 30 when the user accesses the lease site via the user terminal 40. Note that it is assumed that necessary information has been stored in each database of the storage unit 32 of the server 30. In addition, the processing executed by the vehicle information acquisition unit 311, the fee presentation unit 312, and the contract unit 313 will be described as being all executed by the server 30. Similarly, the processing executed by the control unit 41 of the user terminal 40 will be described as being all executed by the user terminal 40.

The user makes a predetermined input to the web browser installed on the user terminal 40. As a result, the user terminal 40 accesses the lease site (S20). At this time, a lease request is generated in the user terminal 40, and is transmitted from the user terminal 40 to the server 30 (S21). For example, when the user taps a button for displaying a lease plan, a button for applying for a lease, a button for requesting a lease fee estimate, or the like on the web page displayed on the display 405 of the user terminal 40, a lease request is transmitted from the user terminal 40 to the server 30. In addition, as another example, it may be determined that a lease request has been transmitted from the user terminal 40 to the server 30 when a predetermined web page is accessed from the web browser on the user terminal 40.

In response to receipt of the lease request, the server 30 extracts vehicle types that can be leased (S22). At this time, the server 30 identifies records of vehicles 10 within a predetermined period of time prior to the dates on which their lease contracts expire, and records of vehicles 10 whose lease contracts have expired, based on the information stored in the contract expiration date field of the vehicle information DB 321. Note that, at this time, vehicles 10 for which the expiration dates of their rebuilding services have passed are excluded. In addition, vehicles 10 each having a predetermined accident history may be excluded based on the vehicle information in the vehicle information DB 321. Also, if there are new vehicle types (models) available for lease, these vehicle types may be included. Information on the new vehicle types available for lease is stored in the storage unit 32. Then, information on the vehicle types is extracted from the vehicle type field of the identified records.

Figure 7:
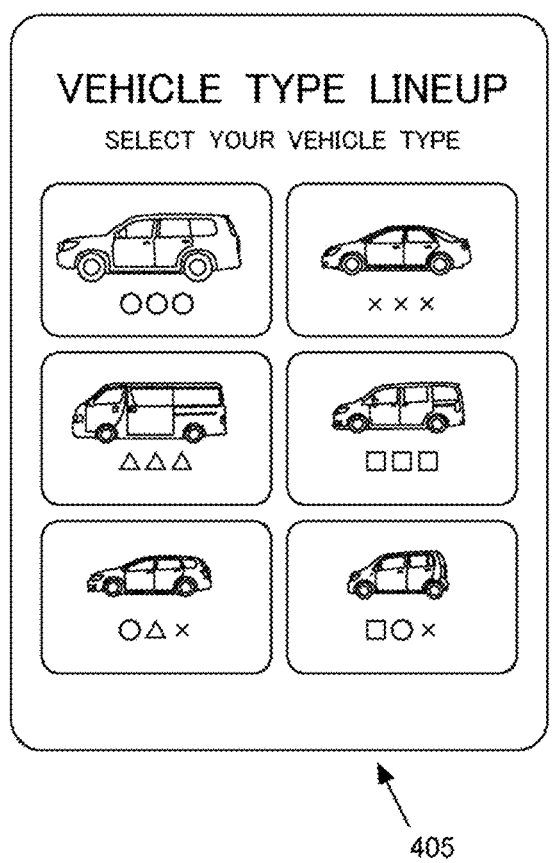
FIG. 7 is a diagram illustrating an example of a web page for selecting a vehicle type.

The server 30 generates a command (vehicle type selection command) to display an image for allowing the user to select a vehicle type, and transmits the command to the user terminal 40 (S23). This command also includes a command to transmit the results of the user's selection from the user terminal 40 to the server 30. At this time, the server 30 may transmit a command for displaying a list of selectable vehicle types to the user terminal 40. The user terminal 40 displays a page for selecting a vehicle type in accordance with the command received from the server 30 (S24). FIG. 7 is a diagram illustrating an example of a web page for selecting a vehicle type. This page is displayed on the display 405.

The user terminal 40 displays a list of vehicle types available for lease, and when the user taps a button corresponding to any of the vehicle types, the user terminal 40 acquires the user's selection (S25). At this time, the user taps, for example, a vehicle type desired to be leased from among a plurality of vehicle types displayed in the list of vehicle types. The user terminal 40 generates vehicle type information according to the vehicle type thus tapped, and transmits it to the server 30 (S26).

Figure 8:
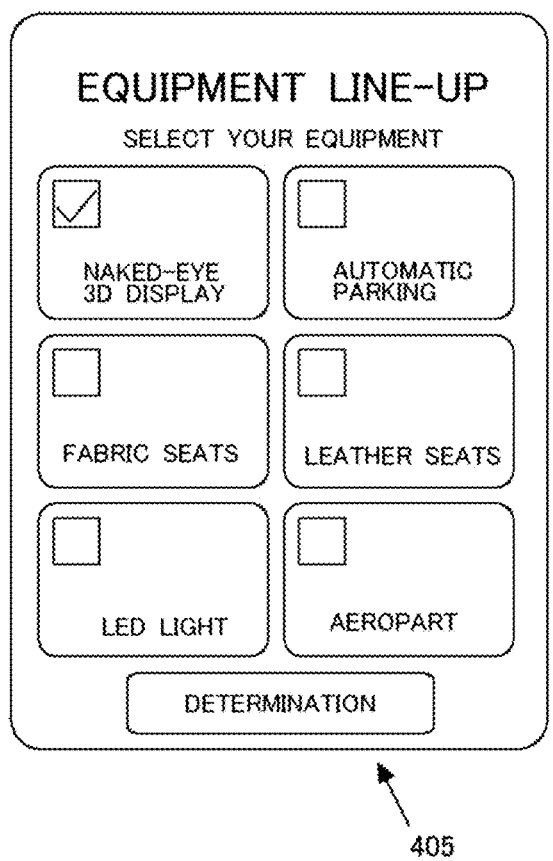
FIG. 8 is a diagram illustrating an example of a web page for selecting equipment.

The server 30, upon receiving the vehicle type information, extracts the selection equipment 22 corresponding to the vehicle type (S27). The relationship between the vehicle type and the selection equipment 22 is stored in the equipment information DB 322. Then, the server 30 transmits a command to the user terminal 40 to display an image for the user to select the equipment 22 (S28). This command also includes a command to transmit the results of the user's selection from the user terminal 40 to the server 30. At this time, the server 30 may transmit a command to the user terminal 40 to display a list of pieces of selectable equipment 22 on the user terminal 40. Also, at this time, a command may be included to display a description and price corresponding to each piece of the selectable equipment 22. The user terminal 40 displays a page for selecting equipment 22 in accordance with the command received from the server 30 (S29). This page may display the description and price for each piece of the equipment 22. FIG. 8 is a diagram illustrating an example of a web page for selecting the equipment 22. This page is displayed on the display 405.

When the user taps a selection button corresponding to any of the pieces of equipment 22 on the page for selecting the equipment 22, the user terminal 40 acquires information on the equipment 22 selected by the user (equipment information) (S30). At this time, the user taps, for example, one or more pieces of equipment 22 that the user wants to install on the vehicle 10 from among a plurality of pieces of equipment 22 displayed in the list of the equipment 22. According to the equipment 22 thus tapped, the user terminal 40 generates equipment information and transmits it to the server 30 (S31).

Here, note that in the present embodiment, the user is first prompted to select the vehicle type and then the equipment 22, but this order may be reversed. That is, the user may be first prompted to select the equipment 22 and then select the vehicle type. Further, as another example, the selection of the vehicle type and the equipment 22 may be simultaneously performed on the same web page. In addition, when the user selects the vehicle type or equipment, or around the time of selection, the server 30 may acquire information on the number of months of the contract desired by the user.

In response to acquisition of the equipment information, the server 30 calculates a lease fee (S32). This lease fee includes a lease fee corresponding to a new vehicle (first vehicle 10A) and a lease fee corresponding to a recycled or rebuilt vehicle (second vehicle 10B). In addition, in cases where there are a plurality of corresponding base units 21, lease fees corresponding to the plurality of base units 21 are respectively calculated. For example, vehicles 10 whose lease contracts have already expired and vehicles 10 whose lease contracts will expire within a predetermined period of time are treated as vehicles 10 that can be refurbished or rebuilt. Then, the server 30 extracts a rebuilding cost corresponding to vehicle information of each vehicle 10 from the rebuilding cost information DB 323, and calculates a rebuilding cost monthly amount by dividing the rebuilding cost by the number of months of the contract. In addition, the server 30 extracts a residual value table corresponding to the vehicle type selected by the user from the residual value information DB 324, and calculates a base unit monthly amount according to the number of months of the contract. Further, the server 30 extracts a price corresponding to the equipment 22 selected by the user from the equipment information DB 322, and divides the price by the number of months of the contract to calculate a selection equipment monthly amount. Note that in cases where initial costs or mid-term termination fees may be charged, these amounts will also be calculated. The server 30 then calculates, as the lease fee, the total of the rebuilding cost monthly amount, the base unit monthly amount, and the selection equipment monthly amount. Also, note that in cases where the lease fee further includes tax, insurance, maintenance charges and the like to be paid in the contract period, the server 30 calculates these amounts and adds them to the lease fee.

After calculating the lease fee according to the base unit 21 and the selection equipment 22, the server 30 transmits a command to the user terminal 40 to display an image for presenting the lease fee (S33). At this time, the server 30 may transmit a command to the user terminal 40 to display the vehicle type selected by the user, the equipment 22 selected by the user, and the lease fee on the user terminal 40. If a plurality of base units 21 are selectable, the server 30 transmits a command to the user terminal 40 to display the lease fee corresponding to each of the base units 21.

Figure 9:
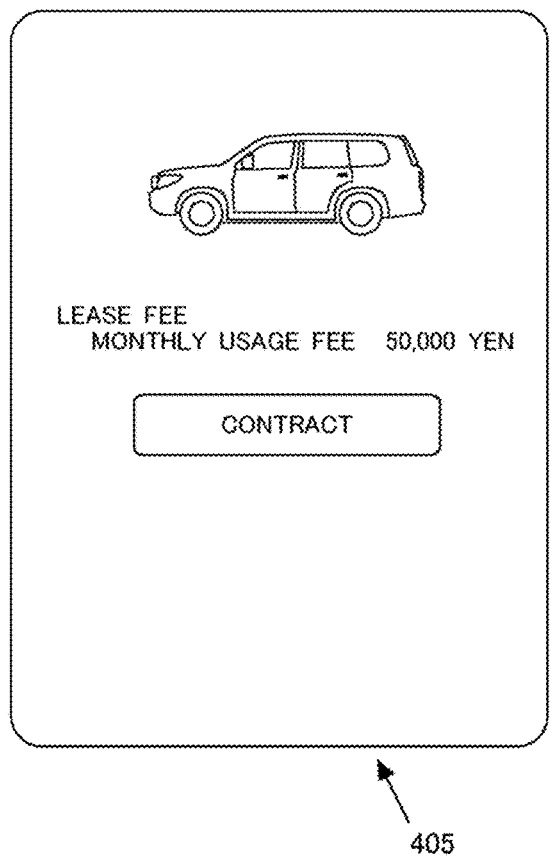
FIG. 9 is a diagram illustrating an example of a web page for presenting a lease fee.

The user terminal 40, upon receiving this information, displays on the display 405 the lease fee corresponding to the base unit 21 selected by the user, thereby presenting the lease fee to the user (S34). Here, FIG. 9 is a diagram illustrating an example of a web page for presenting the lease fee, which is displayed on the display 405 of the user terminal 40. Note that in cases where there are a plurality of corresponding base units 21, lease fees respectively corresponding to the plurality of base units 21 are presented.

In the case where, for example, the user wishes to enter into a lease contract after the lease fee has been presented to the user terminal 40, the user taps or clicks a "CONTRACT" button on the web page shown in FIG. 9. Then, a request for a lease contract is transmitted from the user terminal 40 to the server 30. Upon receipt of this request, the server 30 executes the processing of concluding the lease contract. A known technique can be employed for this processing, and therefore, the description thereof is omitted.

As described above, according to the present embodiment, the base unit 21 can be reused, thus making it possible to improve the global environment and to increase the profit of the leasing company. In addition, by refurbishing or rebuilding the vehicle 10, the user can use the vehicle 10 at a low cost. Further, by adding the equipment 22 selected by the user to the base unit 21, it is possible to install only the equipment 22 desired by the user. That is, it is possible to prevent unnecessary equipment for the user from being installed. Furthermore, since the vehicle 10 that has been used under a lease contract is to be refurbished or rebuilt, the expiration date of the contract is fixed. Therefore, the time to rebuild the vehicle 10 can be predicted. This makes it easy to set up a rebuilding plan for the vehicle 10 in a factory.

OTHER EMBODIMENTS

The above-described embodiment is merely an example, but the present disclosure can be implemented with appropriate modifications without departing from the spirit thereof. The processing and/or means (devices, units, etc.) described in the present disclosure can be freely combined and implemented as long as no technical contradiction occurs. In addition, the processing described as being performed by one device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system. For example, the factory terminal 50 may have some or all of the functions of the server 30, or the server 30 may have some or all of the functions of the factory terminal 50.

In the above-described embodiment, the second vehicle 10B is subject to leasing, but as another example, it may be subject to sale as a refurbished or rebuilt vehicle. In this case, the price of the second vehicle 10B is the sum of the residual value of the base unit 21 at the end of the lease contract for the first vehicle 10A, the cost incurred to reuse the base unit 21, and the price according to the selection equipment 22.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read only memory (ROM), a random access memory (RAM), an EPROM, an EEPROM, a magnetic card, a flash memory, an optical card, or any type of medium suitable for storing electronic commands or instructions.

What is claimed is:

1. A system comprising:
a first vehicle;
a user terminal; and
a server, wherein the first vehicle is configured to:
  detect, by a sensor, data on deterioration of a first portion, that is a portion to be reused when making a second vehicle from the first vehicle;
  transmit the data on the deterioration of the first portion to the server;
the user terminal is configured to transmit, to the server, data of a second portion, that is a portion other than the first portion and is equipped on the second vehicle when making the second vehicle from the first vehicle, the data of the second portion being input to an input apparatus;
the server comprises a processor configured to:
  acquire information on a price of the first portion from a memory;
  acquire, from the first vehicle, the data on the deterioration of the first portion;
  acquire information on a cost of the first portion according to the data efon the deterioration of the first portion;
  acquire the information on the second portion from the user terminal;
  acquire information on a price of the second portion from the memory in response to acquiring the information on the second portion;
  generate information on a price of the second vehicle in accordance with the information on the price of the first portion, the information on the cost of the first portion, and the information on the price of the second portion; and
  transmit, to the user terminal, a command for causing a display of the user terminal to display the generated information on the price of the second vehicle; and
the server is configured to control rebuilding of the second vehicle from the first vehicle by:
  removing existing equipment from the first vehicle,
  repairing the first portion from the first vehicle in accordance with the information on the deterioration, and
  installing the second portion on the repaired first portion to form the second vehicle.

2. An information processing apparatus comprising a processor configured to:
  acquire information on a price of a first portion, which is a portion to be reused when a second vehicle is rebuilt from a first vehicle;
  acquire, from the first vehicle, information on deterioration of the first portion;
  acquire information on a cost incurred for reusing the first portion in accordance with the information on the deterioration of the first portion;
  acquire information on a second portion that is a portion other than the first portion and is equipped on the second vehicle when the second vehicle is rebuilt from the first vehicle;
  acquire information on a price of the second portion in response to acquiring information on the second portion;
  output information on a price of the second vehicle in accordance with the information on the price of the first portion, the information on the cost incurred for reusing the first portion, and the information on the price of the second portion; and
  control rebuilding of the second vehicle from the first vehicle by:
    removing existing equipment from the first vehicle,
    repairing the first portion from the first vehicle in accordance with the information on the deterioration, and
    installing the second portion on the repaired first portion to form the second vehicle.

3. The information processing apparatus according to claim 2, wherein the information on the cost incurred for reusing the first portion is information on a cost incurred when at least a part of the first portion is repaired, replaced, or adjusted in accordance with the information on the deterioration of the first portion.

4. The information processing apparatus according to claim 2, wherein
  the first vehicle is a lease vehicle; and
  the processor outputs information on the price of the second vehicle before a lease period of the first vehicle ends.

5. The information processing apparatus according to claim 2, wherein the processor acquires information on the second portion from a terminal of a user.

6. The information processing apparatus according to claim 2, wherein the second portion is a piece of equipment that is selected by the user from a plurality of pieces of equipment.

7. The information processing apparatus according to claim 2, wherein the processor transmits, to a terminal of a user, a command to display an image corresponding to the information on the price of the second vehicle.

8. The information processing apparatus according to claim 2, wherein the processor determines the price of the first portion in such a manner that the price of the first portion is lower as the period of use of the first portion is longer.

9. The information processing apparatus according to claim 2, wherein the first portion is a portion that is reused from new until a predetermined period of time has passed.

10. The information processing apparatus according to claim 2, wherein the information on the deterioration of the first portion includes at least one of information on a result of self-diagnosis transmitted from the first vehicle and information on an output from a sensor attached to the first vehicle.

11. An information processing method for causing a computer to:
acquire information on a price of a first portion, which is a portion to be reused when a second vehicle is rebuilt from a first vehicle;
acquire, from the first vehicle, information on deterioration of the first portion;
acquire information on a cost incurred for reusing the first portion in accordance with the information on the deterioration of the first portion;
acquire information on a second portion that is a portion other than the first portion and is equipped on the second vehicle when the second vehicle is rebuilt from the first vehicle;
acquire information on a price of the second portion in response to acquiring information on the second portion;
output information on a price of the second vehicle in accordance with the information on the price of the first portion, the information on the cost incurred for reusing the first portion, and the information on the price of the second portion; and
control rebuilding of the second vehicle from the first vehicle by:
removing existing equipment from the first vehicle,
repairing the first portion from the first vehicle in accordance with the information on the deterioration, and
installing the second portion on the repaired first portion to form the second vehicle.

12. The information processing method according to claim 11, wherein the information on the cost incurred for reusing the first portion is information on a cost incurred when at least a part of the first portion is repaired, replaced, or adjusted in accordance with the information on the deterioration of the first portion.

13. The information processing method according to claim 11, wherein the first vehicle is a lease vehicle, and
the method further causing the computer to output information on the price of the second vehicle before a lease period of the first vehicle ends.

14. The information processing method according to claim 11, further causing the computer to acquire information on the second portion from a terminal of a user.

15. The information processing method according to claim 11, wherein the second portion is a piece of equipment that is selected by the user from a plurality of pieces of equipment.

16. The information processing method according to claim 11, further causing the computer to transmit, to a terminal of a user, a command to display an image corresponding to the information on the price of the second vehicle.

17. The information processing method according to claim 11, further causing the computer to determine the price of the first portion in such a manner that the price of the first portion is lower as the period of use of the first portion is longer.

18. The information processing method according to claim 11, wherein the first portion is a portion that is reused from new until a predetermined period of time has passed.

19. The information processing method according to claim 11, wherein the information on the deterioration of the first portion includes at least one of information on a result of self-diagnosis transmitted from the first vehicle and information on an output from a sensor attached to the first vehicle.

* * * * *

UNITED STATES PATENT AND TRADEMARK OFFICE
CERTIFICATE OF CORRECTION

PATENT NO. : 12,462,294 B2
APPLICATION NO. : 18/931670
DATED : November 4, 2025
INVENTOR(S) : Takeshi Murakami It is certified that error appears in the above-identified patent and that said Letters Patent is hereby corrected as shown below:

In the Claims

In Column 17, Line 45, delete "efon" and insert -- on --, therefor.

Signed and Sealed this
Tenth Day of February, 2026

John A. Squires
*Director of the United States Patent and Trademark Office*